United States Patent
Seymour et al.

(10) Patent No.: US 10,794,221 B2
(45) Date of Patent: Oct. 6, 2020

(54) GAS TURBINE ENGINE WITH GEOPOLYMER SEAL ELEMENT

(71) Applicant: United Technologies Corporation, Farmington, CT (US)

(72) Inventors: Kevin Seymour, Hartford, CT (US); Christopher W. Strock, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 735 days.

(21) Appl. No.: 15/496,862

(22) Filed: Apr. 25, 2017

(65) Prior Publication Data

US 2018/0306056 A1 Oct. 25, 2018

(51) Int. Cl.
| | | |
|---|---|---|
| F01D 25/00 | (2006.01) | |
| F01D 11/00 | (2006.01) | |
| C09K 3/10 | (2006.01) | |
| C04B 28/00 | (2006.01) | |
| C04B 14/38 | (2006.01) | |
| C04B 14/46 | (2006.01) | |
| C04B 14/34 | (2006.01) | |
| C04B 20/00 | (2006.01) | |

(Continued)

(52) U.S. Cl.
CPC ........... *F01D 25/005* (2013.01); *C04B 14/34* (2013.01); *C04B 14/386* (2013.01); *C04B 14/4693* (2013.01); *C04B 20/004* (2013.01); *C04B 28/006* (2013.01); *C09K 3/1003* (2013.01); *F01D 11/001* (2013.01); *F01D 11/08* (2013.01); *F01D 11/12* (2013.01); *F01D 5/20* (2013.01); *F05D 2220/323* (2013.01); *F05D 2240/11* (2013.01); *F05D 2240/55* (2013.01); *F05D 2300/17* (2013.01); *F05D 2300/43* (2013.01); *F05D 2300/603* (2013.01); *F05D 2300/604* (2013.01); *F05D 2300/611* (2013.01)

(58) Field of Classification Search
None
See application file for complete search history.

(56) References Cited

U.S. PATENT DOCUMENTS

| | | | |
|---|---|---|---|
| 3,459,680 A * | 8/1969 | Rosinski | ................... B01J 29/08 502/65 |
| 4,608,145 A | 8/1986 | Fairbanks | |

(Continued)

FOREIGN PATENT DOCUMENTS

| | | |
|---|---|---|
| EP | 0550345 | 7/1993 |
| EP | 0292250 | 11/1998 |

(Continued)

OTHER PUBLICATIONS

Geopolynner—Wikipedia (accessed Apr. 24, 2019 via https://en.wikipedia.org/wiki/Geopolymer) (Year: 2019).*

(Continued)

*Primary Examiner* — Christopher Verdier
*Assistant Examiner* — Juan G Flores
(74) *Attorney, Agent, or Firm* — Carlson, Gaskey & Olds, P.C.

(57) ABSTRACT

A gas turbine engine includes a rotatable component and a non-rotatable component. A seal is carried on one of the rotatable component or the non-rotatable component to provide sealing there between. The seal includes a geopolymer seal element.

20 Claims, 2 Drawing Sheets

(51) Int. Cl.
*F01D 11/08* (2006.01)
*F01D 11/12* (2006.01)
*F01D 5/20* (2006.01)

(56) References Cited

U.S. PATENT DOCUMENTS

| | | | |
|---|---|---|---|
| 6,916,529 B2 * | 7/2005 | Pabla | C23C 4/02 |
| | | | 416/241 R |
| 8,975,201 B2 | 3/2015 | Davidovics | |
| 9,543,078 B2 | 1/2017 | Hucker et al. | |
| 2007/0141371 A1 * | 6/2007 | Hazel | C03C 1/006 |
| | | | 428/472 |
| 2011/0103940 A1 * | 5/2011 | Duval | F01D 5/284 |
| | | | 415/173.4 |
| 2015/0377039 A1 * | 12/2015 | Shuck | B23K 35/22 |
| | | | 415/170.1 |
| 2017/0314572 A1 * | 11/2017 | Badeau | F04D 17/10 |

FOREIGN PATENT DOCUMENTS

| | | |
|---|---|---|
| JP | 2008149712 | 7/2008 |
| WO | 2017006102 | 1/2017 |

OTHER PUBLICATIONS

Mohd et al (Study on Fly Ash Based Geopolymer for Coating Applications—Advanced Materials Research—Apr. 2013) (Year: 2013).*

European Search Report for European Patent Application No. 18168992 completed Sep. 6, 2018.

* cited by examiner

GAS TURBINE ENGINE WITH GEOPOLYMER SEAL ELEMENT

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

SUMMARY

A gas turbine engine according to an example of the present disclosure includes a rotatable component, a non-rotatable component, and a seal carried on one of the rotatable component or the non-rotatable component to provide sealing there between. The seal includes a geopolymer seal element.

In a further embodiment of any of the foregoing embodiments, the geopolymer seal element includes at least one of cesium and potassium.

In a further embodiment of any of the foregoing embodiments, the geopolymer seal element includes cesium and potassium.

In a further embodiment of any of the foregoing embodiments, the geopolymer seal element includes, by weight, a greater amount of the cesium.

In a further embodiment of any of the foregoing embodiments, the geopolymer seal element includes, by weight, greater than two times more cesium than potassium.

In a further embodiment of any of the foregoing embodiments, the geopolymer seal element includes reinforcement dispersed there through.

In a further embodiment of any of the foregoing embodiments, the reinforcement includes at least one of silicon carbide fibers or carbon fibers.

In a further embodiment of any of the foregoing embodiments, the geopolymer seal element includes, by volume, 30% to 70% of the silicon carbide fibers or the carbon fibers.

In a further embodiment of any of the foregoing embodiments, the geopolymer seal element includes at least one of cesium and potassium.

In a further embodiment of any of the foregoing embodiments, the seal includes a nickel alloy support attached to the geopolymer seal element.

In a further embodiment of any of the foregoing embodiments, the geopolymer seal element is a coating layer on the nickel alloy support.

In a further embodiment of any of the foregoing embodiments, the reinforcement is metal particles.

In a further embodiment of any of the foregoing embodiments, the metal particles are nickel-based.

In a further embodiment of any of the foregoing embodiments, the metal particles include a base metal selected from the group consisting of aluminum, titanium, and iron.

In a further embodiment of any of the foregoing embodiments, the reinforcement is abrasive particles.

In a further embodiment of any of the foregoing embodiments, the reinforcement is microballoons.

In a further embodiment of any of the foregoing embodiments, the geopolymer includes at least one element selected from the group consisting of lithium, sodium, potassium, rubidium, cesium, and combinations thereof.

In a further embodiment of any of the foregoing embodiments, the geopolymer includes at least two of the elements.

In a further embodiment of any of the foregoing embodiments, one of the two elements is cesium.

In a further embodiment of any of the foregoing embodiments, the geopolymer seal element includes potassium.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
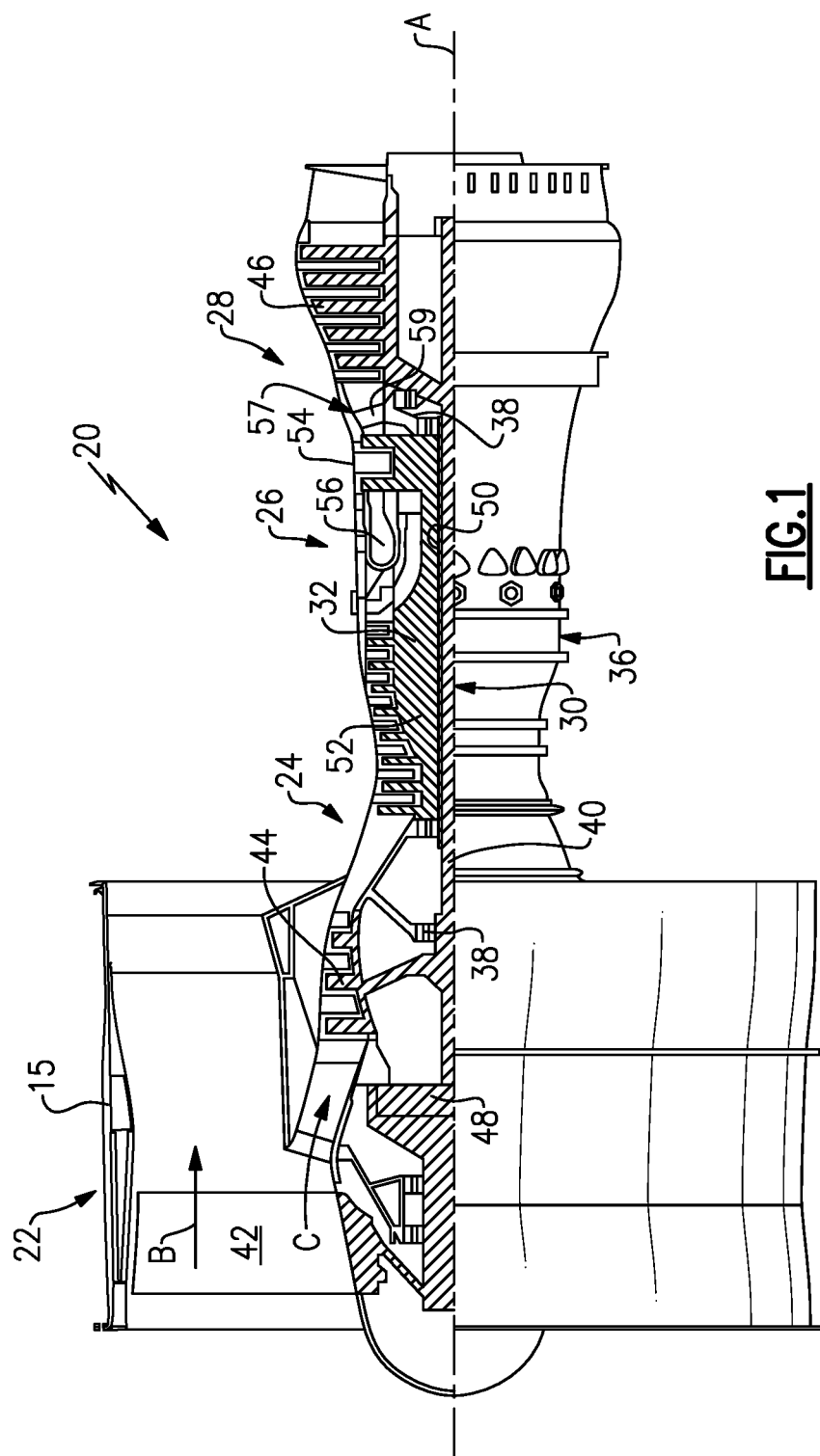
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

The engine 20 includes various types of dynamic seals between rotating and non-rotating components, such as but not limited to, inner air seals, outer air seals, bearing compartment seals, knife edge seals, and the like. The durability of these seals is, in good part, determined by the materials used. In this regard, as will be described in more detail below, the engine 20 utilizes a geopolymer seal element to enhance durability.

Figure 2:
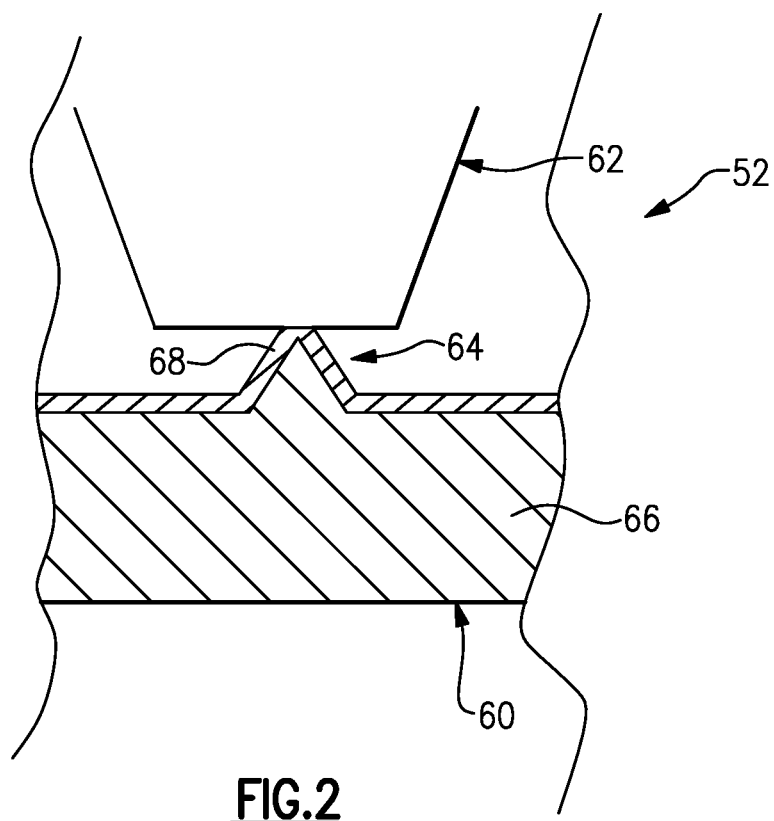
FIG. 2 illustrates a portion of the high pressure compressor of the engine.

FIG. 2 illustrates a representative example implementation of a geopolymer in the high pressure compressor section 52 of the engine 20, although the example is also applicable to seals in other areas of the engine 20. The high pressure compressor 52 includes a rotatable component 60 and a non-rotatable component 62. In this example, the rotatable component 60 is a compressor rotor and the non-rotatable component 62 is a compressor stator vane. A seal 64, or at least a portion thereof, is carried on one of the rotatable component 60 or the non-rotatable component 62. Here, the seal 64 is carried on the rotatable component 60 and serves as a knife edge inner air seal. It is to be understood, however, that the seal 64 could alternatively be carried on the non-rotatable component 62, or that both components 60/62 may carry seals 64. In other implementations in the engine 20, the rotatable component 60 may be a carbon ring or a compressor or turbine blade and the non-rotatable component may be, respectively, a mating element of the carbon ring or an outer air seal of the blade.

The seal 64 includes a support 66 and a geopolymer seal element 68. In this example, the geopolymer seal element 68 is a conformal coating layer attached with the support 66. The geopolymer seal element 68 is formed of, or primarily of, geopolymer. As used herein, a "geopolymer" is an inorganic material that has a long-range, covalently bonded, amorphous network produced by condensation of tetrahedral aluminosilicate units, with alkali metal ions balancing the charge associated with tetrahedral aluminum. Geopolymerization most typically occurs at ambient or slightly elevated temperature, where the leaching of solid aluminosilicate raw materials in alkaline solutions leads to the transfer of leached species from the solid surfaces into a growing gel phase, followed by nucleation and condensation of the gel phase to form a solid binder.

Figure 3:
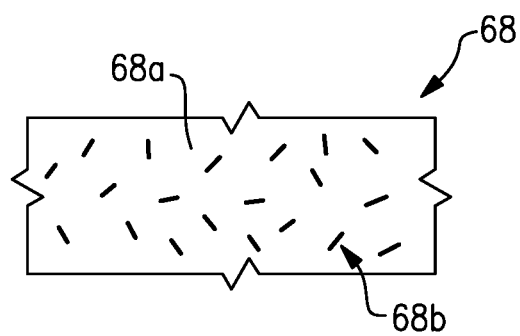
FIG. 3 illustrates a portion of a geopolymer seal element.

FIG. 3 illustrates a representative portion of the geopolymer seal element 68, including geopolymer 68a. Aside from oxygen, aluminum, and silicon, the geopolymer 68a includes one or more alkaline elements, such as lithium, sodium, potassium, rubidium, cesium, and combinations thereof. In one example, the geopolymer includes two of these elements, such as cesium and potassium. For instance, the geopolymer 68a of the seal element 68 includes, by weight, a greater amount of the cesium than of the potassium. In one further example, the geopolymer 68a includes, by weight, greater than two times more cesium than potassium. For instance, the weight ratio of cesium to potassium is approximately 7:3. Although amorphous, the geopolymer 68a can crystallize at high temperatures. The cesium crystallizes to a cubic structure that has relatively low strain in comparison to other structures, which facilitates the reduction of spallation of the geopolymer 68a from the seal element 68.

In further examples, the composition of the geopolymer 68a is:

$NaAlSi_2O_6$

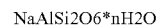

$NaAlSi_2O_6 * nH_2O$

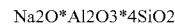

$Na_2O * Al_2O_3 * 4SiO_2$

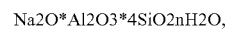

$Na_2O * Al_2O_3 * 4SiO_2 nH_2O$, where, n is an integer (e.g., n=0,1,2,4,10,12)

In further examples, in the above examples, Na can be substituted with K(1-X)CsX or Na(1-X)KX The geopolymer 68a of the seal element 68 may be reinforced or non-reinforced. In FIG. 3, the seal element 68 includes reinforcement 68b dispersed through the geopolymer 68a. That is, the geopolymer 68a serves as a matrix phase to the reinforcement 68b. For example, the reinforcement 68b may be, but is not limited to, silicon carbide or allotropes of carbon, such as graphite carbon fibers, metal particles, abrasive particles, microballoons, and combinations thereof. In one example, the reinforcement 68b is carbon fibers or silicon carbide fibers. For instance, the seal element 68 includes, by volume, 30% to 70% of the carbon fibers or silicon carbide fibers and a remainder of the geopolymer 68a. In one further example, the seal element 68 includes approximately 50% by volume of the carbon fibers or silicon carbide fibers.

The metal particles, if used, may include a base metal selected from nickel, titanium, aluminum, or iron. A "base metal" is one which is the predominant element in the composition of the metal particles. The metal particles may primarily serve to alter the properties of the seal element 68, such as coefficient of thermal expansion.

The abrasives may be used if the seal element 68 is to serve as an abrasive against a mating abradable. For example, the abrasive particles are harder than the geopolymer 68a. For instance, the abrasive particles may be, but are not limited to, silicon carbide, cubic boron nitride particles, diamond particles, aluminum oxide particles, zirconium oxide particles, and combinations thereof.

In another example, the reinforcement 68b includes microballoons, such as glass or ceramic microballoons. The microballoons are substantially spherical, hollow structures that are approximately 0.1 micrometers to 100 micrometers in diameter. The microballoons may serve to reduce the density of the seal element 68, such as using the microballoons as a substitute for open porosity, enhance gas permeation barrier properties, or provide an internal lubricant, for example. The geopolymer 68a is relatively dense and gas impervious, and the microballoons may therefore most typically be used for other purposes.

The composition of the geopolymer 68a and use and selection of the reinforcement 68b is adapted to match the coefficient of thermal expansion (CTE) of the support 66. As an example, the amounts of aluminum, silicon, and alkaline elements may be adjusted in the composition of the geopolymer 68a to alter the CTE toward that of the alloy of the support 66. In a further example, the reinforcement 68b also alters the CTE. For instance, if the support 66 is formed of a nickel-based alloy, nickel-based particles may be used for the reinforcement 68b. In one example, the composition of the nickel-based particles is equivalent to the composition of the nickel-based alloy of the support 64. In one example, the composition is MCrAlY, where "M" is at least one of nickel or cobalt.

The geopolymer 68a can provide a substantial reduction in residual strain in comparison to ceramic oxide seal elements, such as alumina, as well as a CTE that more closely matches the metal alloy of the support 66. For instance, a typical alumina seal element has a CTE difference with nickel of approximately $2.76 \times 10^{-6}$° F., but a cesium/potassium geopolymer as discussed herein has a CTE difference with nickel of only approximately $0.6 \times 10^{-6}$° F.

The geopolymer 68a of the seal element 68 can be fabricated at ambient or near-ambient temperatures. For example, a geopolymer precursor may be painted onto the support 66, where it then cures by condensation polymerization at ambient temperature. Thus, high temperature processes, such as thermal spraying, that are used to deposit ceramic coatings can be avoided, thereby also reducing residual strain. A typical thermally sprayed ceramic coating may have residual strain of a few tenths of a percent, and a geopolymer has virtually 0% residual strain or may be slightly compressive from minor shrinkage. Thermal spraying also often produces anisotropy in the resulting ceramic coating, which may be one factor that contributes to spallation. The geopolymer 68a, particularly if it has the reinforcement 68b, is isotropic, thereby enhancing spallation resistance. The low residual strain, isotropy, and closely matched CTE of the geopolymer seal element 68 may reduce total strain from a few tenths of a percent found in an alumina system to a few hundredths of a percent in the geopolymer system at maximum operating conditions of the engine 20 (approximately 1250° F. in eighth stage of the high pressure compressor 52)

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
a rotatable component and a non-rotatable component;
a seal carried on one of the rotatable component or the non-rotatable component to provide sealing there between, the seal including a geopolymer seal element that is an inorganic material that has a covalently bonded, amorphous network produced by condensation of tetrahedral aluminosilicate units, with alkali metal ions balancing the charge associated with tetrahedral aluminum.

2. The gas turbine engine as recited in claim 1, wherein the geopolymer seal element includes at least one of cesium and potassium.

3. The gas turbine engine as recited in claim 1, wherein the geopolymer seal element includes cesium and potassium.

4. The gas turbine engine as recited in claim 3, wherein the geopolymer seal element includes, by weight, a greater amount of the cesium.

5. The gas turbine engine as recited in claim 3, wherein the geopolymer seal element includes, by weight, greater than two times more cesium than potassium.

6. The gas turbine engine as recited in claim 1, wherein the geopolymer seal element includes reinforcement dispersed there through.

7. The gas turbine engine as recited in claim 6, wherein the reinforcement includes at least one of silicon carbide fibers or carbon fibers.

8. The gas turbine engine as recited in claim 7, wherein the geopolymer seal element includes, by volume, 30% to 70% of the silicon carbide fibers or the carbon fibers.

9. The gas turbine engine as recited in claim 8, wherein the geopolymer seal element includes at least one of cesium and potassium.

10. The gas turbine engine as recited in claim 9, wherein the seal includes a nickel alloy support attached to the geopolymer seal element.

11. The gas turbine engine as recited in claim 10, wherein the geopolymer seal element is a coating layer on the nickel alloy support.

12. The gas turbine engine as recited in claim 6, wherein the reinforcement is metal particles.

13. The gas turbine engine as recited in claim 12, wherein the metal particles are nickel-based.

14. The gas turbine engine as recited in claim 12, wherein the metal particles include a base metal selected from the group consisting of aluminum, titanium, and iron.

15. The gas turbine engine as recited in claim 6, wherein the reinforcement is abrasive particles.

16. The gas turbine engine as recited in claim 6, wherein the reinforcement is microballoons.

17. The gas turbine engine as recited in claim 1, wherein the geopolymer includes at least one element selected from the group consisting of lithium, sodium, potassium, rubidium, cesium, and combinations thereof.

18. The gas turbine engine as recited in claim 17, wherein the geopolymer includes at least two of the elements.

19. The gas turbine engine as recited in claim 18, wherein one of the two elements is cesium.

20. The gas turbine engine as recited in claim 1, wherein the geopolymer seal element includes potassium.

* * * * *